(12) United States Patent
Korenwaitz (10) Patent No.: US 11,974,029 B2
(45) Date of Patent: *Apr. 30, 2024

(54) ON-LINE VIDEO FILTERING (71) Applicant: NETSPARK LTD., Giva't Shmu'el (IL)

(72) Inventor: Elyasaf Korenwaitz, Elon Moreh (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/093,341

(22) Filed: Jan. 5, 2023

(65) Prior Publication Data

US 2023/0156249 A1 May 18, 2023

Related U.S. Application Data (60) Division of application No. 16/666,440, filed on Oct. 29, 2019, now Pat. No. 11,574,476, which is a
(Continued)

(51) Int. Cl.
*H04N 21/8549* (2011.01)
*G06T 7/41* (2017.01)
(Continued)

(52) U.S. Cl.
CPC .......... *H04N 21/8549* (2013.01); *G06T 7/41* (2017.01); *G06T 7/44* (2017.01); *G06V 10/40* (2022.01);
(Continued)

(58) Field of Classification Search
USPC ........................................ 386/241
See application file for complete search history.

(56) References Cited

U.S. PATENT DOCUMENTS 5,740,270 A 4/1998 Rutenberg et al.
6,237,010 B1 5/2001 Hui et al.
(Continued)

FOREIGN PATENT DOCUMENTS

CN 1508755 A 6/2004

OTHER PUBLICATIONS

Theodoros Giannakopoulos et al., "Audio-Visual Fusion for Detecting Violent Scenes in Videos". pp. 1-10. Published by the Computational Intelligence Laboratory, Institute of Informatics and Telecommunications, National Center of Scientific Research Demokritos, Greece.
(Continued)

*Primary Examiner* — Nigar Chowdhury (57) ABSTRACT

Some embodiments relate to a system and method to increase the speed of a computer determination whether a video contains a particular content. In some embodiments, the quantity of data in the video is first reduced while preserving the searched-for content. Optionally, first, the size of the data is reduced by reducing the resolution, for example resolution may be reduced without searching and/or processing the full data set. Additionally or alternatively, low quality and/or empty data is removed from the dataset. Additionally or alternatively, redundant data may be searched out and/or removed. Optionally, after data reduction, the reduced dataset is analyzed to determine if it contains the searched-for content. Optionally, an estimate is made of the probability of the full dataset containing the searched-for content.

14 Claims, 4 Drawing Sheets

Related U.S. Application Data continuation-in-part of application No. PCT/IL2019/051142, filed on Oct. 23, 2019.

(60) Provisional application No. 62/758,589, filed on Nov. 11, 2018.

(51) Int. Cl.

| | | |
|---|---|---|
| *G06T 7/44* | (2017.01) | |
| *G06V 10/40* | (2022.01) | |
| *G06V 10/74* | (2022.01) | |
| *G06V 20/40* | (2022.01) | |
| *H04N 21/234* | (2011.01) | |
| *H04N 21/44* | (2011.01) | |
| *H04N 21/454* | (2011.01) | |

(52) U.S. Cl.
CPC ............ *G06V 10/761* (2022.01); *G06V 20/41* (2022.01); *G06V 20/47* (2022.01); *G06V 20/48* (2022.01); *G06V 20/49* (2022.01); *H04N 21/23418* (2013.01); *H04N 21/44* (2013.01); *H04N 21/454* (2013.01)

(56) References Cited

U.S. PATENT DOCUMENTS

| | | | |
|---|---|---|---|
| 6,310,648 B1 | 10/2001 | Miller et al. | |
| 6,404,925 B1 | 6/2002 | Foote et al. | |
| 6,751,354 B2 | 6/2004 | Foote et al. | |
| 7,080,392 B1* | 7/2006 | Geshwind | H04N 7/0887 |
| | | | 725/38 |
| 7,360,234 B2 | 4/2008 | Robson et al. | |
| 8,311,344 B2 | 11/2012 | Dunlop et al. | |
| 8,682,142 B1 | 3/2014 | Boskovitz et al. | |
| 8,798,400 B2 | 8/2014 | Hill et al. | |
| 8,798,402 B2 | 8/2014 | Hill et al. | |
| 9,620,168 B1 | 4/2017 | Townsend et al. | |
| 9,760,177 B1 | 9/2017 | Ramaswamy | |
| 9,858,967 B1 | 1/2018 | Nomula et al. | |
| 9,892,324 B1 | 2/2018 | Pachauri | |
| 10,230,866 B1 | 3/2019 | Townsend et al. | |
| 10,783,192 B1* | 9/2020 | Soubbotin | G06F 16/2428 |
| 2003/0110182 A1 | 6/2003 | Christophersen et al. | |
| 2004/0170321 A1 | 9/2004 | Gong et al. | |
| 2005/0028194 A1* | 2/2005 | Elenbaas | G06F 16/7834 |
| | | | 725/132 |
| 2005/0060343 A1* | 3/2005 | Gottsman | G06F 16/338 |
| | | | 707/999.102 |
| 2005/0086224 A1* | 4/2005 | Franciosa | G06F 16/3334 |
| 2005/0197923 A1* | 9/2005 | Kilner | G06V 20/52 |
| | | | 382/118 |
| 2005/0265581 A1* | 12/2005 | Porter | G06V 40/173 |
| | | | 382/103 |
| 2005/0265603 A1* | 12/2005 | Porter | G06V 40/167 |
| | | | 382/103 |
| 2006/0193387 A1 | 8/2006 | Wu et al. | |
| 2009/0031246 A1 | 1/2009 | Cowtan et al. | |
| 2010/0145678 A1* | 6/2010 | Csomai | G06F 40/169 |
| | | | 704/10 |
| 2010/0280892 A1 | 11/2010 | Uzunalioglu et al. | |
| 2011/0194761 A1 | 8/2011 | Wang et al. | |
| 2011/0208722 A1 | 8/2011 | Hannuksela | |
| 2011/0217019 A1 | 9/2011 | Kamezawa et al. | |
| 2011/0249073 A1 | 10/2011 | Cranfill et al. | |
| 2011/0301447 A1 | 12/2011 | Park et al. | |
| 2012/0014450 A1 | 1/2012 | Ma et al. | |
| 2012/0148149 A1 | 6/2012 | Kumar et al. | |
| 2012/0293686 A1 | 11/2012 | Karn | |
| 2013/0081082 A1 | 3/2013 | Riveiro Insua et al. | |
| 2013/0086024 A1* | 4/2013 | Liu | G06F 16/951 |
| | | | 707/706 |
| 2013/0262462 A1* | 10/2013 | Srikrishna | G06F 16/78 |
| | | | 707/E17.028 |
| 2013/0336590 A1 | 12/2013 | Sentinelli et al. | |
| 2014/0075004 A1 | 3/2014 | Van Dusen et al. | |
| 2014/0376792 A1 | 12/2014 | Matsuzaki et al. | |
| 2015/0030254 A1 | 1/2015 | Yaguchi | |
| 2015/0081713 A1 | 3/2015 | Alonso et al. | |
| 2015/0127626 A1 | 5/2015 | Park et al. | |
| 2016/0092561 A1 | 3/2016 | Liu et al. | |
| 2016/0225410 A1 | 8/2016 | Lee et al. | |
| 2016/0239718 A1 | 8/2016 | Korenwaitz et al. | |
| 2016/0306811 A1* | 10/2016 | Cao | G06F 16/738 |
| 2016/0358628 A1 | 12/2016 | Liu et al. | |
| 2017/0154104 A1* | 6/2017 | Chen | G06F 16/334 |
| 2017/0187989 A1* | 6/2017 | Feng | H04N 7/147 |
| 2017/0242554 A1 | 8/2017 | Nanjunda Iyer et al. | |
| 2017/0270970 A1 | 9/2017 | Ho et al. | |
| 2017/0289624 A1 | 10/2017 | Avila et al. | |
| 2017/0300752 A1 | 10/2017 | Biswas et al. | |
| 2018/0005082 A1 | 1/2018 | Bluche et al. | |
| 2018/0046858 A1 | 2/2018 | Chen et al. | |
| 2018/0082153 A1 | 3/2018 | Wan et al. | |
| 2018/0091728 A1 | 3/2018 | Brown et al. | |
| 2018/0196880 A1 | 7/2018 | Carter | |
| 2018/0210954 A1* | 7/2018 | Guegan | G06F 16/739 |
| 2018/0212989 A1 | 7/2018 | Mavani | |
| 2018/0247161 A1 | 8/2018 | Cowan | |
| 2018/0322632 A1 | 11/2018 | Barnes et al. | |
| 2018/0341705 A1 | 11/2018 | Kim et al. | |
| 2019/0035091 A1 | 1/2019 | Bi et al. | |
| 2019/0089929 A1* | 3/2019 | Segal | H04N 5/265 |
| 2019/0138809 A1* | 5/2019 | Doshi | G06F 16/7844 |
| 2020/0005048 A1 | 1/2020 | Bharde et al. | |
| 2020/0074005 A1* | 3/2020 | Hewitt | G06F 16/9535 |
| 2020/0301965 A1* | 9/2020 | Cormican | G06F 16/743 |
| 2020/0302242 A1* | 9/2020 | Sanches | G06V 10/809 |
| 2020/0302294 A1* | 9/2020 | Kadav | G06F 16/783 |

OTHER PUBLICATIONS

Giannakopoulos, Theodoros et al. Audio-visual fusion for detecting violent scenes in videos. In: Hellenic conference on artificial inteligence. Springer, Berlin, Heidelberg, 2010. p. 91-100.

S.J. Garrett, Chapter 9—Probability Theory, Editor(s): S.J. Garrett, Introduction to Actuarial and Financial Mathematical Methods, Academic Press, 2015, pp. 275-304, ISBN 9780128001561, https://doi.org/10.1016/B978-0-12-800156-1.00009-1. (https://www.sciencedirect.com/science/article/pii/B9780128001561000091).

\* cited by examiner

ON-LINE VIDEO FILTERING

RELATED APPLICATION/S

This application is a continuation in part of U.S. patent application Ser. No. 16/666,440 filed 29 Oct. 2019 which is a continuation in part of PCT/IL2019/051142 filed 23 Oct. 2019 which claims priority benefit from U.S. Provisional Application No. 62/758,589, filed Nov. 11, 2018.

This application claims the benefit of priority of U.S. patent application Ser. No. 16/666,440 filed 29 Oct. 2019 and of International Patent Application no. PCT/IL2019/051142 filed 23 Oct. 2019

This application claims the benefit of priority under 35 USC § 119(e) of U.S. Provisional Patent Application No. 62/758,589, filed Nov. 11, 2018, the contents of all of the above are incorporated herein by reference in their entirety.

FIELD AND BACKGROUND OF THE INVENTION

The present invention, in some embodiments thereof, relates to a screening videos and, more particularly, but not exclusively, to a fast method of detecting a content in a video.

U.S. Pat. No. 8,798,402 apparently discloses "A system and method for analyzing video include segmenting video stored in computer readable storage media into keyframes. Near-duplicate keyframes are represented as a sequence of indices. The near-duplicate keyframes are rendered in a graphical representation to determine relationships between video content."

U.S. Pat. No. 9,805,280 appears to the present inventor disclose, "A system including: (a) a network hub or port adapted to detect image files in transit according to their file designations; (b) an object detector configured to identify one or more regions of interest (ROI) in each image file as potentially containing an object of interest (OOI); (c) a feature analyzer adapted to express one or more General Classification Features (GCF) of each ROI as a vector; and (d) a decision module adapted accept or reject each ROI as containing said OOI based upon the one or more GCF vectors."

Additional background art includes US published patent application no. 20040170321, U.S. Pat. Nos. 8,798,400, 8,311,344, U.S. published patent application no. U.S. published patent application no. 20120148149, U.S. published patent application no. 20160358628, U.S. published patent application no. 20160092561, U.S. published patent application no. 20110301447, U.S. Pat. Nos. 6,751,354, 6,404,925, and 5,740,270.

SUMMARY OF THE INVENTION

According to an aspect of some embodiments of the invention, there is provided a method to determine a presence of a sought content in video including: summarizing the video to form a summary; preserving the content of the video in the summary; and analyzing the summary for the presence of the sought content.

According to some embodiments of the invention, the summarizing includes: determining a representative element volume (REV) of the sought content and reducing a level of precision to an order of the REV.

According to some embodiments of the invention, reducing is to a level of precision that is inherent in the video.

According to some embodiments of the invention, the summarizing includes selecting a collection of key frames and the summary includes the collection of key frames.

According to some embodiments of the invention, the summarizing includes removing low information data.

According to some embodiments of the invention, removing low information data includes computing an entropy of a portion of the video and removing the portion of the video when the entropy is low.

According to some embodiments of the invention, removing low information data includes computing an entropy of a key frame and removing the key frame in response to the computed entropy being low.

According to some embodiments of the invention, the summarizing includes removing redundant data.

According to some embodiments of the invention, removing redundant data includes computing a General Classification Features (GCF) value of at least two frames and comparing the GCF between the at least two frames and removing at least one of the at least two frames when the GCF of the at least two frames is similar.

According to some embodiments of the invention, the computing a GCF includes computing an Edge Histogram value for each of the at least two frames.

According to some embodiments of the invention, the comparing is of all frames in a group without accounting for sequencing within the group.

According to some embodiments of the invention, the method further includes determining an uncertainty of a determination of the presence of the content in the video.

According to some embodiments of the invention, the determining an uncertainty of a presence of the content in the video includes computing an uncertainty of determination the presence in a sample.

According to some embodiments of the invention, the determining an uncertainty of the presence of the content in the video includes computing an uncertainty of the presence of the content between two samples.

According to some embodiments of the invention, the uncertainty of the presence of the content between two samples takes into account a spatial autocovariance.

According to some embodiments of the invention, the method further includes performing further processing when the uncertainty is high.

According to an aspect of some embodiments of the invention, there is provided a system for in-line content filtering of video including: a connection to a public network a server receiving video content from a public network over the connection; the server including a video summary module configured to output a summary of the video content, the summary being smaller than the video content and preserving a sought content, a detection module configured to detect a sought content in the summary, a decision module configured for facilitating sending the video content a user device in response to the detection module not detecting the sought content and to inhibit the sending when the detection module detects the sought content in the summary a connection between the server and a user device configured for sending the video content to the user device in accordance with a decision from the decision module.

According to some embodiments of the invention, the server further includes a video disassembly module configured to separate key frames from the video and supply them to the video summary module and wherein the summary includes a subset of the key frames.

According to some embodiments of the invention, the video summary module is configured for: determining a representative element volume (REV) of the sought content and reducing a level of precision the summary to an order of the REV.

According to some embodiments of the invention, the video summary module is configured for selecting a collection of key frames and the summary includes the collection of key frames.

According to some embodiments of the invention, the video summary module is configured for removing low information data.

According to some embodiments of the invention, the video summary module is configured for computing an entropy of a portion of the video and removing the portion of the video when the entropy is low.

According to some embodiments of the invention, the video summary module is configured for computing an entropy of a key frame and removing the key frame from the summary in response to the computed entropy being low.

According to some embodiments of the invention, the video summary module is configured for removing redundant data.

According to some embodiments of the invention, the video summary module is configured for computing a General Classification Features (GCF) value of at least two frames and comparing the GCF between the at least two frames and removing at least one of the at least two frames when the GCF of the at least two frames is similar.

According to some embodiments of the invention, the video summary module is configured for computing an Edge Histogram value for each of the at least two frames and wherein a value of the GCF depends on the Edge Histogram.

According to some embodiments of the invention, the video summary module is configured for comparing all frames in a group without accounting for sequencing within the group.

According to some embodiments of the invention, the server is further configured for determining an uncertainty of a determination of a presence of the content in the video.

According to some embodiments of the invention, the video summary module is configured for computing an uncertainty of determination the presence in a sample.

According to some embodiments of the invention, the video summary module is configured for computing an uncertainty of the presence of the content between two samples.

According to some embodiments of the invention, the video summary module is configured for computing a spatial autocovariance between frames.

According to some embodiments of the invention, the video summary module is configured for performing further processing when the uncertainty is high.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to an on-line filtering of videos and, more particularly, but not exclusively, to a fast method of detecting a content in a video.

Overview

In some embodiments, there may be a desire to reduce the time and/or increase accuracy for analyzing a video for a content. For example, for on-line content filtering there is a desire to analyze content (supplying permissible content and/or removing undesired content) and/or supply the content to a user with a small delay time, for example of between a fraction of second to a second to a few seconds. Such fast analysis may be difficult, especially when dealing with large data objects, for example video content and/or fine distinctions between permissible and impermissible content (for example the different between permissible sports videos and undesired pornography and/or violence). In some embodiments, the speed of analysis will be improved by making relatively fast data transformations before analyzing for content. In some embodiments, the purpose of the data transformation may be to reduce the total computational burden. For example, a fast transformation may be used to a reduce data before a more expensive transformation. In some embodiments, removal of redundant and/or unclear data when forming the summary may reduce identification errors that may result from analyzing noisy data and/or from random errors that come up while analyzing the large data set and/or from bias of repeated frames.

An aspect of some embodiments of the current invention relates to a system and method to increase the speed of a computer determination whether a video contains a particular content. In some embodiments, the quantity of data in the video is first reduced while preserving the searched-for content. The reduction is configured both for efficiency (e.g. high-speed execution) and to avoid losing the searched-for content. Optionally, first, the size of the data is reduced quickly, by reducing the resolution, for example resolution may be reduced without searching and/or processing the full data set. Additionally or alternatively, low quality and/or empty data is removed from the dataset. Additionally or alternatively, redundant data may be searched out and/or removed. Optionally, after data reduction, the reduced dataset is analyzed to determine if it contains the searched-for content. Optionally, part of video may be reduced to a collection of images. Images may optionally may be analyzed using image analysis tools, an example of such tools is disclosed in U.S. Pat. No. 9,805,280 of the present inventor. Optionally, based on the results of the analysis of the reduced dataset and/or knowledge about the removed data, an estimate is made of the probability of the full dataset containing the searched-for content.

In some embodiments resolution of a video is reduced. For example, with respect to the searched-for content, a representative elementary volume (REV) is defined. The REV may be in time and/or area. For example, when scanning a film for pornographic images it may be decided that significant pornographic scenes are unlikely to last less than 5 seconds. Then a REV (Representative elementary volume) may be defined as 5 seconds. Then the time resolution of the dataset may safely be reduced to something of the order of the REV, for example between 1 to 2 REV's and/or between ½ to 1 REV and/or between ¼ to ½ REV and/or less than ¼ REV. Optionally, the resolution reduction will be to a level that is easy to reach. For example, for a digital video it may be easy to reduce to the time resolution of the video by keeping only key frames and ignoring transition data. For example, if the frame interval is less than the REV then a reduced video may include only a portion of the key frames.

In some embodiments, a video content scheme may remove low information data from a data set before analyzing the for content. For example, a low-cost algorithm may be used to detect low quality and/or low information content sections. For example, a scalar and/or vector value may be assigned to each frame in a frame set. For example, key frames may be sorted according to their entropy levels. Low entropy frames may have little information and/or may be discarded. Optionally an easily computed and/or compared quantity may be used to indicate the information level.

In some embodiments, redundant data may be removed before analysis. Optionally, the redundant data will be found using an inexpensive quick routine without requiring high degree of quality in the identification. For example, a scalar and/or vector quantity may be used to characterize each key frame. For example, using a General Classification Function (GCF) for example an Edge Histogram Distribution (EHD).

In some embodiments, temporal data and/or sequencing of images may be ignored. For example, when removing redundant frames and/or detecting content temporal information may be ignored. Alternatively or additionally, frames be grouped in sets of a short time span but precise sequencing may be ignored. Alternatively or additionally, routines may consider sequencing and/or movement.

An aspect of some embodiments of the current invention relates to evaluating an uncertainty in a determination of a content of a video based on a quick analysis of an abbreviated version of the video. In some embodiments, after analyzing a video for a sought content a processor will estimate a probability that the content was missed and/or miss-identified. For example, the estimated probability will take into account the size of the sampling interval and the size of the REV and/or the uncertainty in analysis of each sample and/or the association with content found in the sample with the sought content and/or rate of change. Optionally, sample may be sent for further testing based on the effect of improving analysis of that sample on level of uncertainty in the entire video.

Specific Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
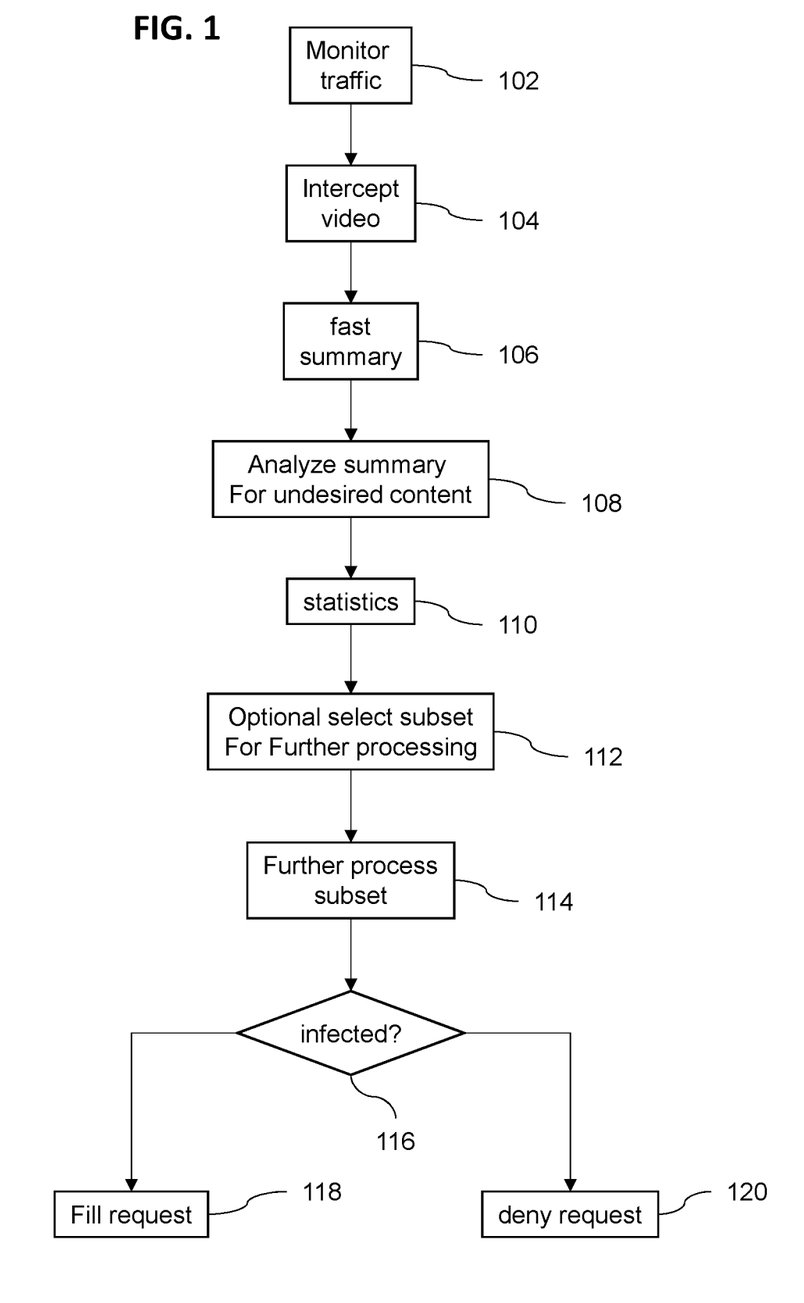
FIG. 1 is a flow chart illustration of on line filtering of a video in accordance with an embodiment of the current invention.

FIG. 1 is a flow chart illustration of on-line filtering of a video in accordance with an embodiment of the current invention. In some embodiments, content delivered to a user is monitored 102 for undesired video content. For example, a filtering server may intercept 104 video data and summarize 106 the video. The resulting summary is optionally analyzed 108 for example to determine if it includes an undesired content. For example, a search algorithm seeks the content in the summary. In some embodiments, the server will determine 110 a probably of the undesired content searched for in the summary is present in the rest of the video that were not included in the search and/or including the probability that content present in the summary was not detected. Optionally, the server may compare the reduction in uncertainty of presence of undesired content in the video from reducing uncertainty in each of at least two samples and/or a select 112 a frame. For example, it may be determined which frame to send for further processing 114 to best reduce uncertainty. For example, the further processing 114 may include manual analysis of a set of one or more frames. For example, for videos, when the probability of infection with undesired content and/or the quantity and/or the quality of the undesired content is not beyond an acceptable limit, the server may allow delivery 118 of the content to a user. For example, for videos, when the probability of infection with undesired content and/or the quantity and/or the quality of the undesired content is beyond an acceptable limit, the server may block 120 delivery of the content to a user.

In some embodiments, the summarizing 106 of the data is arranged to facilitate fast of forming the summary and/or fast analyses of the summary for the content. Alternatively or additionally, the summarizing 106 of the data is arranged to avoiding removing significant data and/or reduce errors in the analysis 108 for content.

Figure 2A:
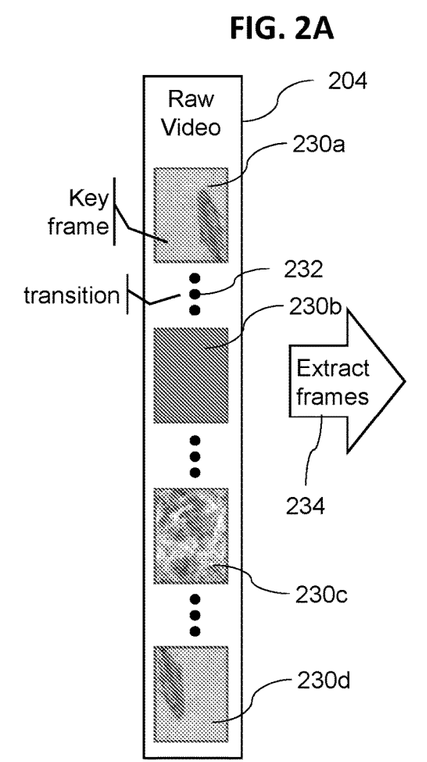
FIG. 2A is a schematic illustration of a raw video in accordance with an embodiment of the current invention in a schematic illustration of data reduction of a video of FIGS. 2A-2E in accordance with an embodiment of the current invention.

FIGS. 2A-2E are a schematic illustrations of data reduction of a video in accordance with an embodiment of the current invention. FIG. 2A illustrates a raw video with a set of frames 230a-230d and transition data 232. Optionally redundant data will be removed leaving enough data to determine the presence of the searched-for content with reduced excess data that might slow down analysis of content.

Figure 2B:
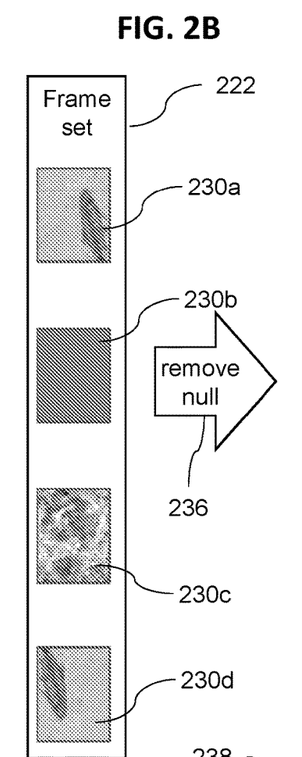
FIG. 2B is a schematic illustration of a set of video frames in accordance with an embodiment of the current invention.

FIG. 2A illustrates reducing video is from the raw video 204 by extracting 234 frames 230a-230d to give a set 222 of frames 230a-230d (e.g. as illustrated in FIG. 2B). For example, the raw video may include a sequence of key frames 230a-230d and/or transition information 232 between the frames 230a-230d. The summary may be based on reducing temporal resolution, for example by extracting 234 and/or using only the key frames 230a-230d (removing the transition information 232 and/or avoiding decoding the transition data 232). Alternatively or additionally, for example where the temporal REV of the searched-for content is greater than an interval between key frames 230a-230d, some of the key frames 230a-230d may be removed during extraction 234 of frames, further reducing the temporal resolution. For example, a frame may occur every two seconds while a REV is 5 seconds. Accordingly, every other key frame may be removed and/or one key frame may be retained in every 4 second period. Alternatively or additionally, the level of spatial resolution in the key frames may be reduced. For example, key frames 230a-230d may be compressed using known picture compression means and/or the resolution may be reduced by combining pixels.

Figure 2C:
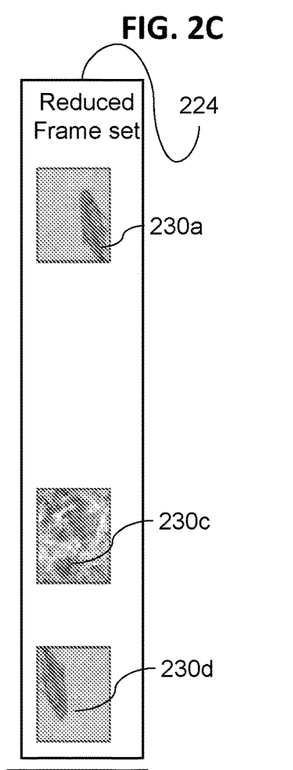
FIG. 2C is a schematic illustration of a set of video frames after removal of null frames in accordance with an embodiment of the current invention.

In some embodiments, the frame set 222 may be further summarized to a reduced frame set 224 (e.g. as illustrated in FIG. 2C). For example, null frames containing little valuable information may be removed 236. For example, a frame 230b having low entropy may be removed 236. Alternatively, null frames 230 may be removed from the full frame set 222 and then excess frames may be removed to reduce temporal resolution. In some embodiments, removal of transition data 232 and/or poorly defined frames may also reduce errors in the analysis of content. For example, analyzing blurry and/or poorly defined inter-frame data and/or low entropy blurry frames may add to the likelihood of erroneous conclusions without significantly improving the analysis for real content. Thus, removing this data may increase the accuracy of the analysis. For example, the removal of interframe data 232 and/or low entropy data (e.g. null frame 230b) may serve a function like the human mind's filtering of extraneous background.

Figure 2D:
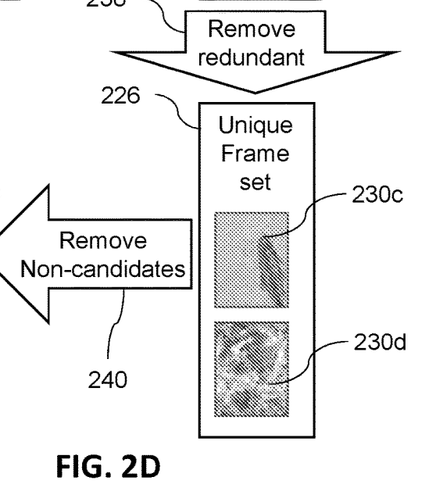
FIG. 2D is a schematic illustration of a set of video frames after removal of redundant frames in accordance with an embodiment of the current invention.

In some embodiments, the reduced frame set 224 may be further summarized by removing 238 redundant frames (e.g. frame 230d) resulting in a unique frame set (e.g. set 226 of FIG. 2D). Optionally, a content dependent routine may further reduce the unique from set 226 by eliminating 240 those frames that can easily be determined as unlikely to contain the searched-for content. A summary may result in a small sample preserved data set 228 which will be searched for the searched-for content. In some embodiments, removal of transition data 232 and/or poorly defined frames 230b and/or redundant frames 230d may also reduce errors in the analysis of content. For example, analyzing the same frame multiple times may increase the chance of incorrectly identifying a content without significantly adding to the accuracy of the analysis. Furthermore, the presence of a lot of repeated slides may bias the data. Thus, in some embodiments removing 238 redundant data 230d may increase the accuracy of the analysis.

In some embodiments, the order of the operations of summarizing the dataset is from the simple to the more difficult. For example, the full video data set 204 may be reduced by extracting 234 key frames 230a-230d. Extracting 234 key frames 230a-230d optionally requires no decision making and/or analyzing of the data, the key frames 230a-230d are essentially separate from the transition data 232 in the video file. For example, a further step may include removing 236 low information frames 230b. To recognize a low information frame 230b may include computing a simple function on individual frames (e.g. entropy) without finding relations between of different frames. Decisions may optionally be made by comparing a simple value (for example a scalar entropy value) to a constant threshold value. Optionally, as the data set becomes smaller more complex operations are used for further reduction. For example, on the reduced frame set 224, redundant frames may be removed 238 including comparing slides among the entire set 224 (e.g. frame 230a, 230c and 230d) and/or comparing slides among subsets and/or in accordance with a sequence of the frames, for example to find and/or remove 238 redundant similar frames (e.g. removing 238 frame 230d which is similar to frame 230a which is kept) resulting in a further reduced unique frame set 226. For example, the unique frame set 226 may be further processed using more complex content recognition routines (for example GCF functions, flesh recognition routines and the like) to get a sample preserved set 228 for full analysis. Comparing frames may include computing a distance between scalar and/or vector quantities the measure one or more aspects of different frames.

In some embodiments, a GCF function (for example EHD) may be used for one of both analyzing the content of a "frame" (e.g. deciding in the frame contains significant information and/or if the frame includes a particular content) and/or for identifying a frame signature (for example to compare frames and/or remove redundant frames). The identifying of a signature is optionally flexible enough to recognize redundant frames even when there are slight changes within the frames. Identifying a signature is optionally very fast. In some embodiments, when identifying a signature, the GCF output may be converted from a vector to a scalar (for example, by connecting all the parameters), for example to more easily and/or more quickly identify similar "frames."

Figure 2E:
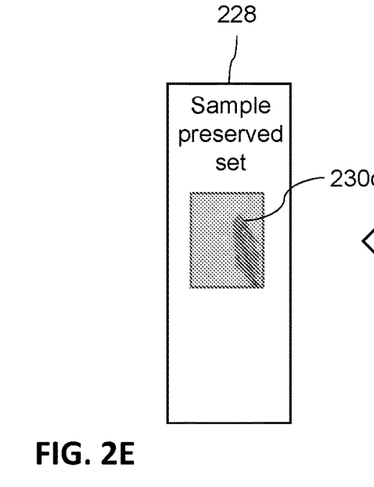
FIG. 2E is a schematic illustration of a set of video frames after removal of non-candidate frames in accordance with an embodiment of the current invention.

In some exemplary embodiments of the invention, an initial screening to recognize and/or remove 240 non-candidates is conducted using one or more Boosted Cascade classifier algorithms selected from the group consisting of Haar, LBP, LRD, LRP, HOG textural features, and SkinBlob Detection or every other possible detection feature different from GCF used for post filtering. According to various exemplary embodiments of the invention one or more additional General Classification Features (GCF) are used to improve the accuracy of the initial screening. According to various exemplary embodiments of the invention the GCFs include one or more of color moment, Gabor function, color histogram, skin blob geometric information, color layout, intensity edge histogram, 3 colors plane edge histogram, color structure and scalable color. In some embodiments, each GCF is expressed as a vector with a natural number value of 1 or 2 representing two class discrimination system and two probability variables between 0 and 1. In some embodiments, a global probability vector is used to summarize 2, 3, 4, 5, 6, 7, 8 or more GCFs. Alternatively or additionally, in some embodiments a formula is used to summarize 2, 3, 4, 5, 6, 7, 8 or more GCFs and/or the global probability vector. In some embodiments various types of artificial intelligence to detect reduce data and/or detect content. For example, a Convolutional neural network (CNN) routine may be used (for example available routines may be used such as AlexNet, VGG, GoogLeNet or ResNet).

In some embodiments, data may be added back at some points along the process. For example, after the first analysis for content some frames may be sent for hand processing. For example, hand processing may not be slowed significantly by large resolution of individual frames. Optionally, in a case where a spatial resolution of a frame was reduced during processing, the original high-resolution version of the frame may be used for hand processing.

Figure 3:
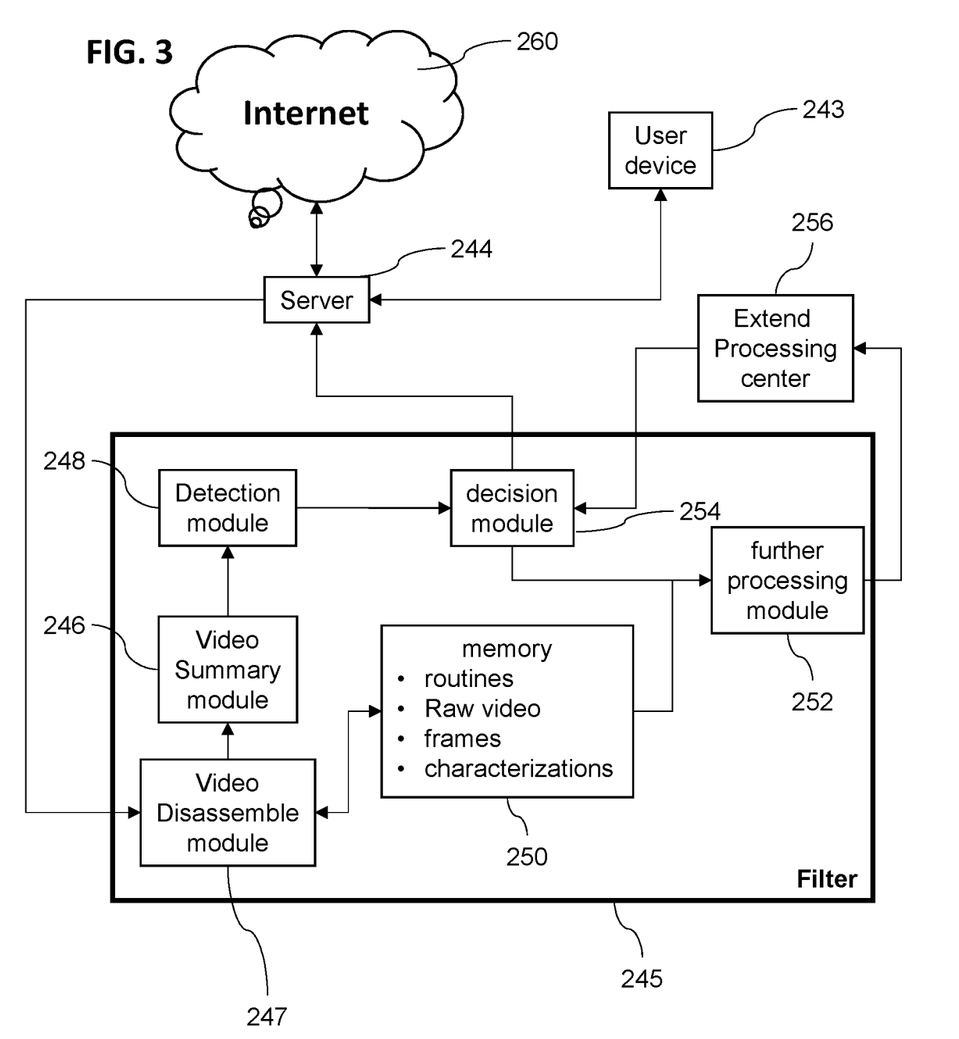
FIG. 3 is a block diagram illustration of a system of on-line video filtering in accordance with an embodiment of the current invention.

FIG. 3 is a block diagram illustration of a system of on-line video filtering in accordance with an embodiment of the current invention. In some embodiments, a user device 243 may request a video file (e.g. from an Internet server 244). The server 244 optionally retrieves the file from the Internet 260. Before delivering the file to user device, the sever optionally passes the file through an automatic in-line filter 245. The file may be sent to the user only after receiving approving from the filter. It may be desired to supply the video content such that 1) the user does not have to wait long before receiving the first block of the video and/or 2) further blocks of the video are sent to the user within a time faster then the buffer time of the previous block (e.g. the video is screened smoothly without breaks waiting for the next video block). In some embodiments, before sending approval to the server 244, the filter 245 analyzes the video to determine if it contains an undesired content. Optionally the filter 245 includes modules to perform the analysis fast enough to deliver the video within the time limitations.

In some embodiments, the video may include a sequence of key frames and/or transition data, Decoding the checking of the entire video may be prohibitively expensive in terms of computing time. Optionally the data and/or complexity of the video may be reduced to a collection of samples preserving the undesired content. Optionally analysis is performed on a summary of the video rather than decoding and/or checking the entire the entire video.

In some embodiments, a video disassembly module 247 may be supplied to extract the key frames from the video. Optionally, a collection of frames is sent from the disassembly module 247 to a video summary module 246. For example, the video summary module 246 may remove frames that are closer in time than a critical time interval (such as a REV and/or a portion thereof). Alternatively or additionally, the summary module may search for low information frames and/or remove them. Alternatively or additionally, the summary module may remove redundant frames. For example, the summary module may use a measure of content and keep only one frame of a group of slides having a similar measure of content. For example, the measure of content may be represented by a vector and/or a scalar value. For example, an edge histogram EHD may be use as a measure of similarity. Optionally, redundant similar frames are removed regardless to their position on the video. Alternatively or additionally, redundant similar frames are only eliminated if they are close to each other in time in the video. Alternatively or additionally, eliminating similar slides accounts for the sequence of the frames. In some embodiments the summary module will contain a content specific filter. For example, a when searching for pornography, a filter may eliminate slides that do not contain a lot of skin tones and/or have full color (i.e. are not dark and/or are not dominated by one color [e.g. a picture taken under blue light may be dominated by blue and not include recognizable skin tones due to the source light]). Optionally the summary module 246 outputs summary data to a detection module 248.

In some embodiments, the summary data is sent from the summary module to a detection module. Optionally the detection module 248 determines whether the searched-for content (for example undesirable content) is present in the summary data. Alternatively or additionally, the detection module 248 determines a probability that the searched-for content is present in the data set and/or in a frame and/or in a group of frames. Optionally, the decision module 254 computes the probably of the presence of the content in the video and/or a level of uncertainty and/or a way to reduce the uncertainty. Optionally, for example, if the uncertainty is too great, the decision module 254 will send a portion of the video to a further processing module 252 for further processing, for example to reduce the uncertainty.

In some embodiments, data for further processing is further summarized. For example, further summarizing may include removing certain data to make the further processing fast. Alternatively or additionally, the further summarizing may include restoring certain data that was removed in the first summarizing set. For example, in some embodiments, further processing module 252 may include manual classification group (for example human viewers and/or viewing equipment). Optionally, one or more frames are selected from the summary data for manual classification. Optionally, the selection of frames for further processing is based on the level of uncertainty in each frame. Alternatively or additionally, selection of frames for further processing is based on the level of uncertainty that each frame can reduce in the video. For example, in some cases when resolution was reduced to speed automatic processing, higher resolution frames (for example the original frames stored in a memory) are sent for further processing. Optionally, the results of the further processing are sent to the decision module 254. For example, the decision may be based on the results of the detection module 248 and/or the further summary module 254 (for example including an extended processing center) instruct the server 244 whether to supply the video to the user device 243.

In some embodiments, a user device and/or the further processing module 252 may include a video decoding module and/or a user interface for displaying a video and/or a frame therefrom. Alternatively or additionally, the user device 243 and/or the further processing module 252 may include a user interface for communication of a human with the system. Alternatively or additionally, the user device 243 and/or the extended processing module 252 may include communication components for communicating with the server 244 and/or the decision module 254.

Figure 4:
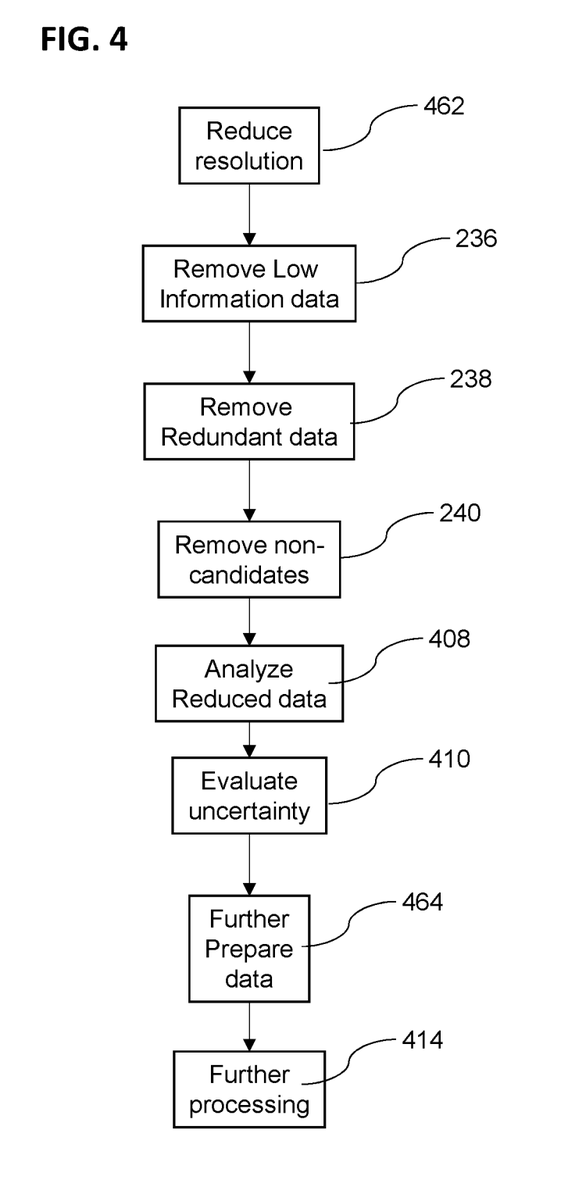
FIG. 4 is a flow chart illustration of determining a content of a video in accordance with an embodiment of the current invention.

FIG. 4 in a flow chart overview of a method of detecting content in accordance with an embodiment of the current invention. In some embodiment, an initial simple method is used to reduce content from the full video. For example, resolution may be reduced 462. For example, steps of the reduction 462 of data may take advantage of inherent divisions in the data, for example the division between key frames and transition data. In some embodiments, a representative element is determined and resolution is reduced to a level at which and acceptable preserving of information on the scale of the REV. Optionally, significant data will not be lost while the volume of the data is significantly reduced.

In some embodiments, further reduction of the data set may employ progressively more complex routines. For example, the resolution reduced data set may be processed to remove 236 low information data and/or remove 238 redundant data. Optionally, simple detection routines may be used to recognize and remove 240 non-candidate data.

In some embodiments, the reduced data set is analyzed 408 for the searched-for content and/or an uncertainty is computed 410. Optionally, content may be found using an image analysis system, an example of such a system is disclosed in U.S. Pat. No. 9,805,280 by the present inventor. Optionally, further processing 414 may be used for example to reduce the uncertainty. Optionally, the data is further prepared 464 for further processing 414. For example, preparing 464 may include further reducing the data (e.g. by extracting only data that has high uncertainty and/or where reducing uncertainty will significantly reduce the uncertainty of the entire video) and/or only a portion of the summary data set is sent for further processing 414. Optionally some of the original data is restored to the data set before further processing.

It is expected that during the life of a patent maturing from this application many relevant robotic technologies and/or Artificial Intelligence technologies will be developed and the scope of the terms are intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for fast determination of a presence of a particular searched-for content in a video comprising:
   summarizing said video to produce a content specific summary preserving said particular content including
      extracting a collection of key frames from the video,
      recognizing, in said collection of key frames, frames unlikely to contain said particular searched-for content via a content sensitive filter and
      eliminating said frames unlikely to contain said particular searched-for content from said collection of key frames thereby producing the content specific summary;
   detecting the presence of said particular searched-for content in said video by means of analyzing said content specific summary with an artificial intelligence routine to detect said particular searched for content; and
   determining a presence of content in the video based on a result of said detecting.

2. The computer implemented method of claim 1, wherein said artificial intelligence routine is trained to estimate a probability of the presence of the particular searched-for content.

3. The method of claim 1, wherein said summarizing includes reducing said collection of key frames including: identifying duplicate frames in said collection of key frames; removing said duplicate frames from said collection of key frames resulting a set of unique frames and wherein said detecting is performed on said set of unique frames.

4. The computer implemented method of claim 3, wherein said recognizing frames unlikely to contain said particular searched-for content includes identifying in said collection of key frames, by means of said content sensitive filter, frames which include a related content associated with said particular searched-for content.

5. The computer implemented method of claim 1, wherein said summarizing further includes: determining a representative element volume (REV) of said particular searched-for content and reducing a level of precision to an order of said REV.

6. The computer implemented method of claim 1, wherein said summarizing includes removing a low information key frame from said collection of key frames.

7. The computer implemented method of claim 6, wherein removing low information key frame includes computing an entropy of a key frame of said video and removing said key frame of the video when said entropy is low.

8. The computer implemented method of claim 1, wherein said recognizing, said detecting and said eliminating are applied without accounting for sequencing within the video.

9. The computer implemented method of claim 1, wherein said determining includes computing a probability that the particular searched-for content is present in the video.

10. The computer implemented method of claim 1, further comprising performing further processing to reduce an uncertainty in said presence of the particular searched-for content in the video.

11. The computer implemented method of claim 10, wherein said further processing includes manual analysis of a frame.

12. The computer implemented method of claim 1, wherein said particular searched-for content is preselected.

13. The computer implemented method claim 12, wherein said particular searched-for content is an undesired content.

14. The computer implemented method of claim 9, wherein probability that the particular searched-for content is present in the video takes into account a spatial autocovariance.

* * * * *